United States Patent [19]

Aspden et al.

[11] Patent Number: 4,655,998
[45] Date of Patent: Apr. 7, 1987

[54] LIQUID METAL COOLED NUCLEAR RECTOR CONSTRUCTIONS

[75] Inventors: Garth J. Aspden, Bolton; Keith F. Allbeson, Altrincham, both of England

[73] Assignee: National Nuclear Corporation Limited, London, England

[21] Appl. No.: 555,011

[22] Filed: Nov. 25, 1983

[30] Foreign Application Priority Data

Dec. 3, 1982 [GB] United Kingdom ................ 8234494

[51] Int. Cl.⁴ ............................................. G21C 9/00
[52] U.S. Cl. .................................... 376/290; 376/287; 376/289
[58] Field of Search ....................... 376/287, 289, 290; 250/515.1, 518.1, 519.1

[56] References Cited

U.S. PATENT DOCUMENTS

| | | | |
|---|---|---|---|
| 3,421,977 | 1/1969 | Hutchinson et al. | 376/289 |
| 3,489,206 | 1/1970 | Lecourt | 376/289 |
| 3,493,758 | 2/1970 | Parker et al. | 376/287 |
| 3,595,728 | 7/1971 | Robson | 376/289 |
| 4,062,518 | 12/1977 | Stivender et al. | 250/519.1 |
| 4,258,521 | 3/1981 | Fricker et al. | 376/289 |
| 4,324,619 | 4/1982 | Guerin | 376/290 |
| 4,464,334 | 8/1984 | Artaud et al. | 376/290 |

FOREIGN PATENT DOCUMENTS

| | | |
|---|---|---|
| 1466848 | 2/1969 | Fed. Rep. of Germany ... 250/519.1 |
| 2624634 | 12/1977 | Fed. Rep. of Germany . |
| 2734348 | 4/1981 | Fed. Rep. of Germany . |
| 2506063 | 11/1982 | France . |

Primary Examiner—Deborah L. Kyle
Assistant Examiner—Richard W. Wendtland
Attorney, Agent, or Firm—William R. Hinds

[57] ABSTRACT

In a liquid metal cooled nuclear reactor with a nuclear fuel assembly in a coolant-containing primary vessel housed within a concrete containment vault, there is thermal insulation to protect the concrete, the insulation being disposed between vessel and concrete and being hung from metal structure secured to and projecting from the concrete, the insulation consisting of a plurality of adjoining units each unit incorporating a pack of thermal insulating material and defining a contained void co-extensive with said pack and situated between pack and concrete, the void of each unit being connected to the voids of adjoining units so as to form continuous ducting for a fluid coolant.

8 Claims, 3 Drawing Figures

LIQUID METAL COOLED NUCLEAR RECTOR CONSTRUCTIONS

BACKGROUND OF THE INVENTION

This invention relates to nuclear reactors, and in particular to liquid metal cooled nuclear reactors. Such reactors are generally of the fast breeder type.

A liquid metal cooled nuclear reactor is usually housed in a steel vessel which is itself enclosed within a concrete containment vault, and in order to prevent damage to the concrete due to heat radiated from the vessel containing the reactor core it is usual to interpose thermal insulation between vessel and vault.

It is an object of the present invention to provide a construction of thermal insulation capable of protecting the concrete of the vault from heat radiation from the reactor vessel, even under fault conditions.

FEATURES AND ASPECTS OF THE INVENTION

According to the invention, in a liquid metal cooled nuclear reactor comprising a nuclear fuel assembly in a coolant-containing primary vessel housed within a concrete containment vault and having thermal insulation interposed between the vessel and the vault, the thermal insulation consists of a plurality of adjoining units each hung from metal structure secured to and projecting from the concrete of the vault, each unit including a pack of thermal insulating material and also including a contained void co-extensive with the said pack, such void being situated between the pack and the concrete and being connected to the void of at least one adjoining unit so as to form a continuous duct or ducts for a fluid coolant.

Adjoining units of the thermal insulation are advantageously interleaved or overlapped in order to present a barrier to radiation passing between the units and to minimise leakage of fluid coolant from said duct or ducts.

The said metal structure is preferably formed so that the said units are themselves spaced from the concrete of the vault in order to provide a volume in which the environmental atmosphere remains generally static, thereby to assist in thermal insulation. The said metal structure preferably consists of stanchions secured to spaced pads embedded in the concrete of the vault, there being pegs projecting from the stanchions at convenient intervals and from which the said units are hung with a keyhole or other suitable engagement. Conveniently there are two pegs for each unit arranged symmetrically.

Each unit is preferably of sheet metal construction and defining the void, with the pack of heat insulation material mounted on that void boundary which is remote from the concrete, and the edges of both metal sheets defining the void and the thermal insulation being arranged so that there is interleaving or over-lapping between adjoining units after assembly.

DESCRIPTION OF THE DRAWINGS

A typical construction of thermal insulation according to the invention will now be described by way of example, with reference to the accompanying drawings, wherein.

DESCRIPTION OF THE PREFERRED EMBODIMENT

Figure 1:
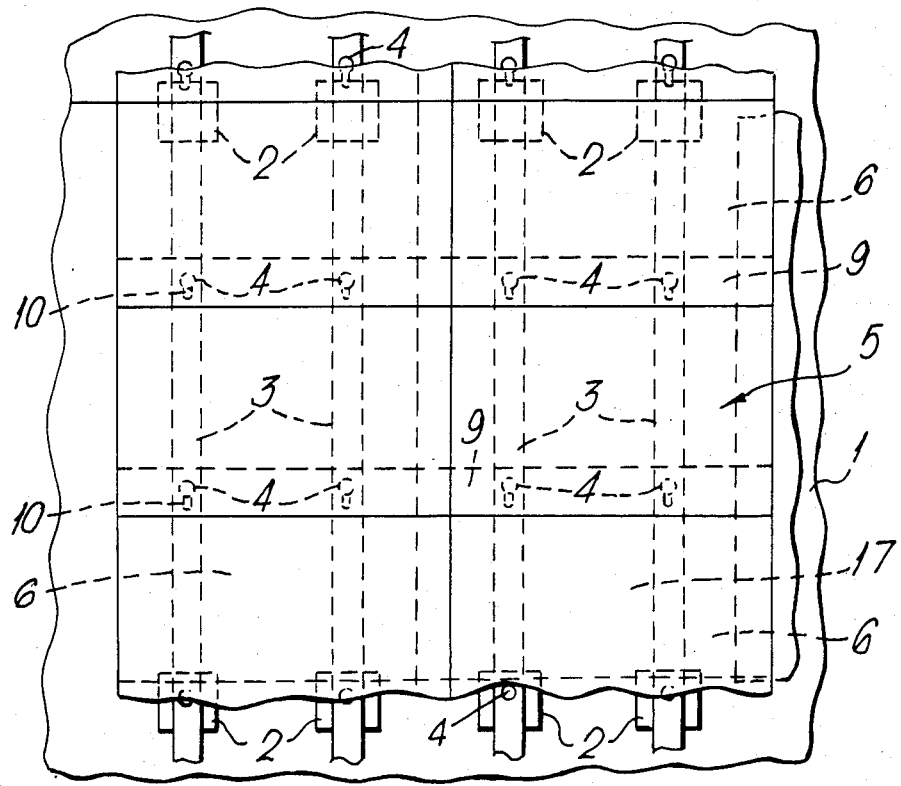
FIG. 1 is a fragmentary side view.
Figure 2:
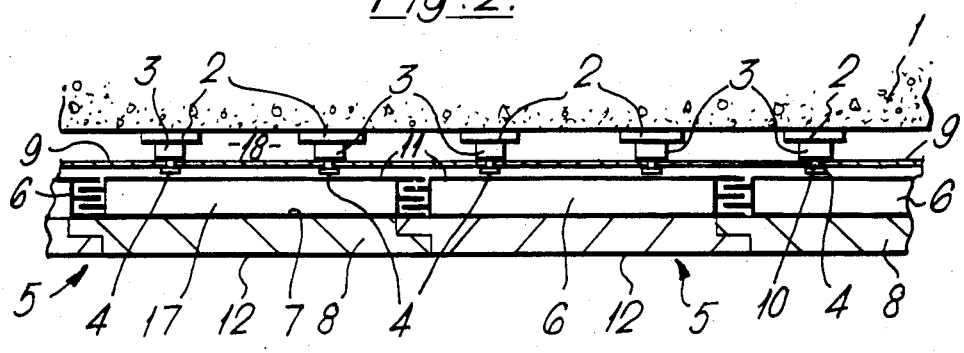
FIG. 2 is a plan view of FIG. 1.
Figure 3:
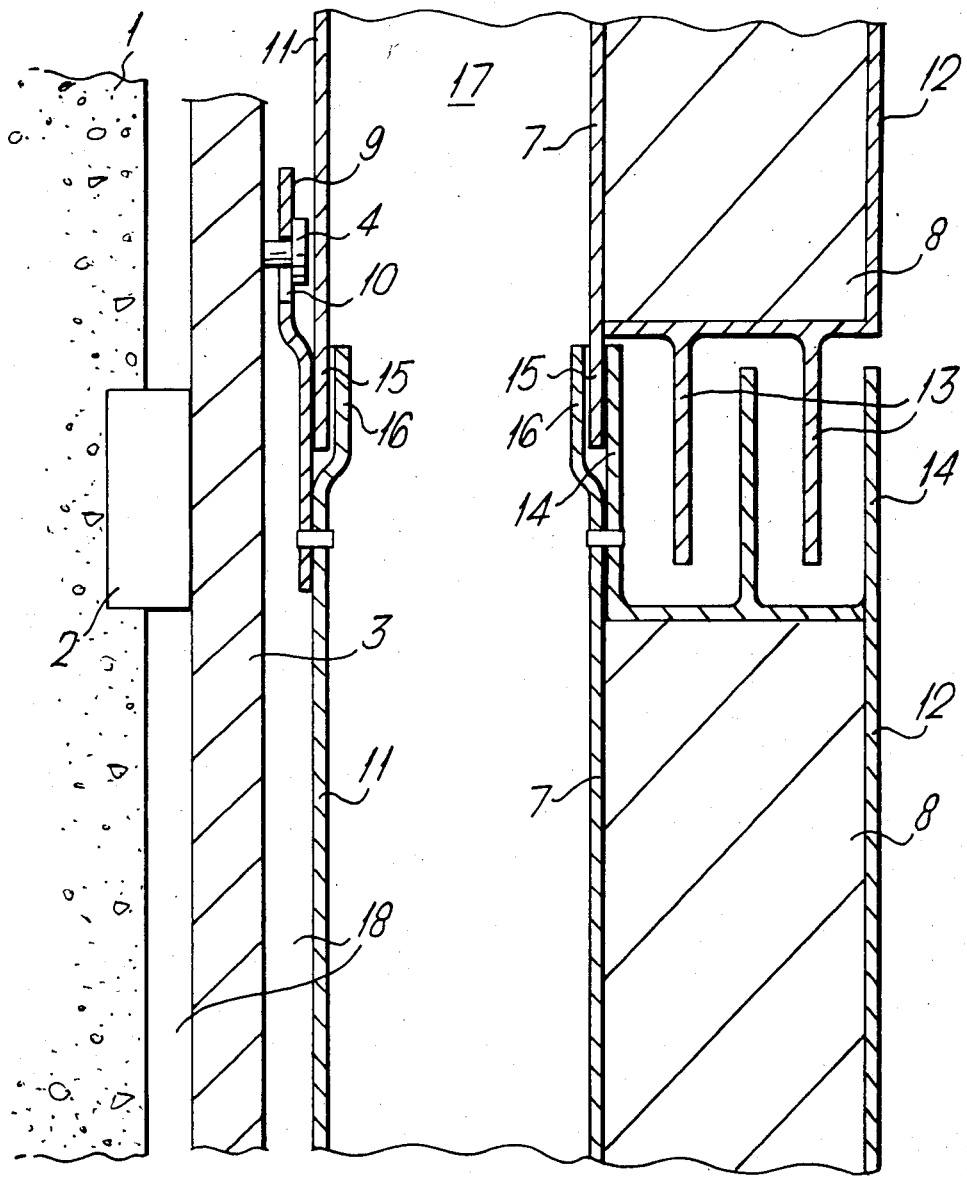
FIG. 3 is an enlarged end view in medial section.

The concrete vault enclosing the primary vesel of a sodium cooled fast breeder nuclear reactor is of generally cylindrical shape with a rounded base and an open top closed by a roof. For convenience, only a part of one side is illustrated in FIG. 1, viewed from the interior and designated 1. The construction of thermal insulation is similar for the vault base to that described for the vault side and is continuous therewith. The concrete has embedded in it at spaced intervals a plurality of pads 2, and aligned pads 2 carry a stanchion 3 extending in a vertical direction, there being a number of stanchions 3 spaced equally and parallel to one another. Each stanchion carries a number of spaced pegs 4, and it is arranged in this construction but is not limiting that a pair of pegs 4 at the same level but of two adjacent stanchions 3 serve to provide hanging support for a unit generally indicated by the reference numeral 3. Each unit 5 is constructed of sheet metal in box-like manner so as to include a contained void 6 and has on the outer side of the outer wall 7 defining the void 6 a pack 8 of heat insulating material, see particularly FIGS. 2 and 3. Each peg engages with a keyhole slot 10 in a leaf 9 (see FIG. 3) welded or otherwise secured to the inner boundary wall 11 of the void 6 so that the respective unit 5 is hung symmetrically from two pegs 4, see FIG. 1. The pack 8 is protected on its outside, which faces the outer surface of the primary vessel, not shown, by a sheet metal boundary 12.

The units are arranged in adjoining manner both upwardly, downwardly and sideways so as to present a more or less continuous face to the outer surface of the primary vessel. At the joins it is arranged that there is interleaving, see particularly FIGS. 2 and 3. This is accomplished for the packs 8 of units 5, by lengthy projections 13 depending from the lower edge of the pack 8 of a unit 5 interleaving with lengthy projections 14 raised from the upper edge of the next adjoining, in a downward sense, pack 8 of the respective unit 5. Insofar as the voids 6 of adjacent units 5 are concerned, the lower edge 15 of a upper unit 5 is engaged in a forked portion 16 of the next adjoining, in a downward sense, unit 5. The expedients minimise radiation streaming and gas leakage between units 5. The units 5 are built up from the lowest to the highest rows at a time.

The voids 6 are thus interconnected to form vertical ducts 17 in side-by-side relationship. As can be seen from FIG. 2, interconnection is avoided between units 5 which adjoin in horizontal manner, there being interleaving in the manner described for the stacked packs 8 of FIG. 3. The packs 8 have a simple overlap joint between sideways adjoining units 5. The spacing left between the concrete and the wall 11 serves to provide a static fluid volume 18 which can either be occupied by the same cooling fluid (eg a blanket gas) as is made to flow in ducts 17 by pumping, or can be occupied by another environmental atmosphere.

We claim:

1. A liquid metal cooled nuclear reactor comprising a nuclear fuel assembly housed in a coolant-containing primary vessel which is housed within a concrete containment vault and having thermal insulation interposed between the vessel and the vault, the improvement comprising: said thermal insulation consisting of a plurality of adjoining units, metal structure secured to and projecting from the concrete of the vault and from which each thermal insulation unit is hung, each said unit including a pack of thermal insulating material, each unit also including a contained void co-extensive with said pack, said void being situated between said pack of thermal insulating material and the concrete, and means connecting the void of each unit to the void of at least one adjoining unit so as to form continuous ducting for a fluid coolant.

2. A nuclear reactor according to claim 1, wherein adjoining units have interleaving means for presenting a barrier to radiation and for minimising leakage of fluid coolant from said ducting.

3. A nuclear reactor according to claim 1, wherein the said metal structure is formed so that the said units are themselves spaced from the concrete of the vault to form with the concrete a volume of generally static environmental atmosphere to assist in thermally insulating the concrete.

4. A nuclear reactor according to claim 1, wherein the said metal structure comprises spaced pads embedded in the concrete of the vault, stanchions secured to said pads, and pegs projecting from the stanchions at spaced positions, said units being hung from the pegs with keyhole engagement.

5. A nuclear reactor according to claim 2, wherein each unit is constructed from sheet metal and defines said void, with said pack of thermal insulating material mounted on that void boundary which is remote from the concrete, said interleaving means being provided at the edges of both the metal sheets defining the void and the thermal insulation pack.

6. A nuclear reactor as claimed in claim 3 wherein said volume between the units and the concrete contains a generally static gas.

7. A nuclear reactor as claimed in claim 1 wherein said fluid coolant in said ducting is other than liquid metal coolant.

8. A nuclear reactor as claimed in claim 7 wherein said fluid coolant in said ducting is a gas.

* * * * *